United States Patent
Jang

(10) Patent No.: US 10,029,568 B2
(45) Date of Patent: Jul. 24, 2018

(54) SYSTEM FOR WARNING OF DROWSINESS OF DRIVER AND METHOD THEREOF

(71) Applicant: MANDO CORPORATION, Pyeongtaek-si, Gyeonggi-do (KR)

(72) Inventor: HyunSeop Jang, Yongin-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 0 days.

(21) Appl. No.: 15/279,430

(22) Filed: Sep. 29, 2016

(65) Prior Publication Data
US 2017/0096063 A1 Apr. 6, 2017

(30) Foreign Application Priority Data

Oct. 5, 2015 (KR) .................. 10-2015-0139751

(51) Int. Cl.
| B60W 40/08 | (2012.01) |
| B60K 28/06 | (2006.01) |
| B60W 30/12 | (2006.01) |

(52) U.S. Cl.
CPC .......... *B60K 28/066* (2013.01); *B60W 30/12* (2013.01); *B60W 2520/10* (2013.01); *B60W 2540/18* (2013.01)

(58) Field of Classification Search
CPC ......... H60W 40/08; H60W 2040/0817; H60W 2040/0818; H60W 2540/26
USPC ................................ 340/575, 576
See application file for complete search history.

(56) References Cited

U.S. PATENT DOCUMENTS

| 4,463,347 A * | 7/1984 | Seko .................... B60K 28/066 180/272 |
| 2004/0209594 A1* | 10/2004 | Naboulsi ............. B60R 11/0264 455/404.1 |
| 2014/0300740 A1* | 10/2014 | Fujioka .................. H04N 7/183 348/148 |
| 2015/0183458 A1* | 7/2015 | Noh ..................... B62D 5/0487 701/43 |
| 2016/0100088 A1* | 4/2016 | Sekiguchi ............. B60W 50/00 701/48 |
| 2017/0057521 A1* | 3/2017 | Jain ....................... B60W 50/14 |

FOREIGN PATENT DOCUMENTS

| JP | 5546655 B2 | 7/2014 |
| KR | 20-0377647 Y1 | 3/2005 |

OTHER PUBLICATIONS

Korean Office Action for corresponding Korean Patent Application No. 10-2015-0139751 dated Feb. 20, 2017.

* cited by examiner

*Primary Examiner* — Kevin Kim
(74) *Attorney, Agent, or Firm* — Hauptman Ham, LLP

(57) ABSTRACT

The present embodiment provides a driver's drowsiness warning system. The driver's drowsiness warning system according to the present embodiments of the present disclosure may include: a steering angle sensor that measures a steering signal; a lane recognizing sensor that recognizes a lane; a lane keeping assist unit that determines whether a vehicle is out of a lane that the vehicle drives along; and a controller that determines whether a driver is drowsy based on at least one out of a frequency of a change in the steering signal during a predetermined period of time and how frequently the vehicle is out of the lane during a predetermined period of time, and generates a warning to the driver when it is determined that the driver is drowsy.

4 Claims, 4 Drawing Sheets

SYSTEM FOR WARNING OF DROWSINESS OF DRIVER AND METHOD THEREOF

CROSS REFERENCE TO RELATED APPLICATION

This application claims priority from Korean Patent Application No. 10-2015-0139751, filed on Oct. 5, 2015, which is hereby incorporated by reference for all purposes as if fully set forth herein.

BACKGROUND OF THE INVENTION

1. Field of the Invention

The present invention relates to a system and a method for warning a driver who is drowsy while driving.

2. Description of the Prior Art

Drowsy driving is the operation in which a driver falls asleep while driving. While a driver is asleep for only three seconds in a vehicle that runs 100 km/h, the vehicle moves 83 m. During that time, the vehicle moves without any control.

To prevent drowsy driving, a technology for sensing a driver's drowsiness state and providing a warning to the driver is being developed. In the technology, the driver's drowsiness state is determined based on a biometric signal (e.g., eyeballs, brainwave, body temperature, or the like).

However, in the case of the detection of brainwaves, mounting causes an inconvenience and a separate module may be required, and thus, costs may increase.

In the case of the detection of eyeballs, a separate module is also required, and thus, costs may increase.

In the case of the detection of body temperature, this may be implemented by closely sticking a detection sensor film to a hand or a back. However, in the case in which a detection sensor is mounted onto a steering wheel to detect a change in the temperature of a hand, the detection sensor may not make a decision when a hot-wire of the steering wheel operates. In the case in which a detection sensor is mounted onto a sheet to detect a change in temperature of the back, the detection sensor may not make a decision when a hot-wire or a ventilation sheet operates.

SUMMARY OF THE INVENTION

The present embodiments are derived to overcome the above described drawbacks, and an aspect of the present invention is to provide a system and method that senses a driver's drowsiness state based on a motor position sensor (MPS) signal in an electric power steering (EPS) and a steering request signal generated in a line keeping assist system (LKAS), and provides a warning.

An embodiment of the present disclosure provides a driver's drowsiness warning system, including: a steering angle sensor that measures a steering signal; a lane recognizing sensor that recognizes a lane; a lane keeping assist unit that determines whether a vehicle is out of a lane that the vehicle drives along; and a controller that determines whether a driver is drowsy based on at least one out of a frequency of a change in the steering signal during a predetermined period of time and how frequently the vehicle is out of the lane during a predetermined period of time, and generates a warning to the driver when it is determined that the driver is drowsy.

Another embodiment of the present invention provides a driver's drowsiness warning method, which is executed in a system that includes a steering angle sensor, a lane recognizing sensor, a lane keeping assist unit that enables a vehicle to keep a lane, and a controller, the method including: measuring, by the steering angle sensor, a steering signal; recognizing, by the lane recognizing sensor, a lane; determining, by the lane keeping assist unit, whether a vehicle is out of the lane based on the recognized lane; determining whether a driver is drowsy based on at least one out of a frequency of a change in the steering signal during a predetermined period of time and how frequently the vehicle is out of the lane during a predetermined period of time; and generating, by the controller, a warning to the driver when it is determined that the driver is drowsy.

According to the embodiments of the present disclosure, a driver's drowsiness state is sensed based on an EPS system and an LKAS system without a separate module for sensing a biometric signal, and a warning is provided to a driver.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
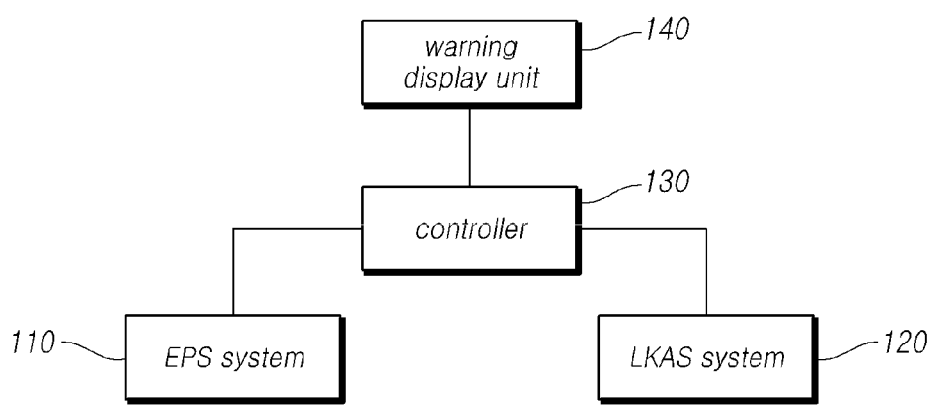
FIG. 1 illustrates a configuration of a system according to an embodiment of the present disclosure.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

FIG. 1 illustrates a configuration of a system according to an embodiment of the present disclosure.

Referring to FIG. 1, a driver's drowsiness warning system according to an embodiment of the present disclosure includes an electric power steering (EPS) system 110, a lane keeping assist system (LKAS) system 120, a controller 130, and a warning display unit 140.

Figure 2:
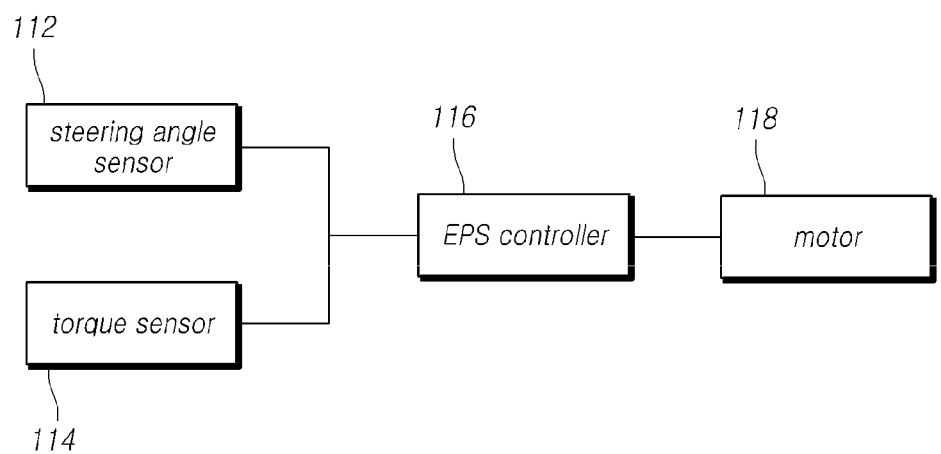
FIG. 2 illustrates an example of the configuration of the EPS system of FIG. 1.

FIG. 2 illustrates an example of the configuration of the EPS system 110 of FIG. 1. The EPS system 110 may strengthen the steering of a steering wheel, thereby helping driver perform steering.

Referring to FIG. 2, the EPS system 110 may include: a steering angle sensor 112 that measures a steering angle; a torque sensor 114 that measures a steering torque; an EPS controller 116 that calculates an assistant steering force based on at least one out of a measurement value of the steering angle sensor 112 and a measurement value of the torque sensor 114 and generates a control signal based on the result of the calculation; and a motor 118 that generates an assistant steering force based on a control signal of the EPS controller 116.

The steering angle sensor 112 may be a sensor that measures the rotation angle of a steering axis or the rotation angle of a motor. The torque sensor 114 may be a sensor that measures a steering torque provided to a steering axis. The EPS controller 116 may generate a control signal based on a steering angle and a steering torque, and the motor 118 may generate assistant steering force based on the control signal.

Figure 3:
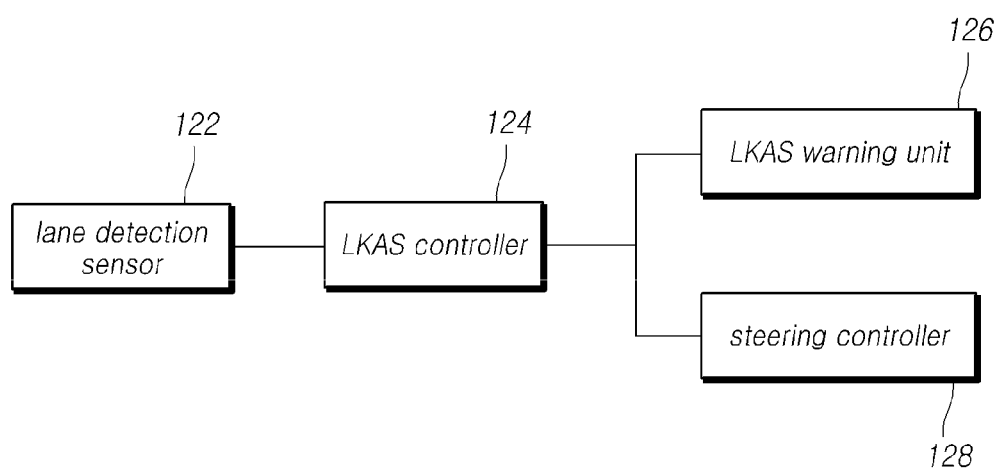
FIG. 3 illustrates an example of the configuration of the LKAS system of FIG. 1.

FIG. 3 illustrates an example of the configuration of the LKAS system 120 of FIG. 1. The LKAS system 120 is a system that helps a vehicle keep a lane. The LKAS system 120 may include a lane departure warning (LDS) system, which is a system that warns a driver when a vehicle is out of a lane, and a lane keeping system (LKS), which is a system that enables a vehicle to automatically keep a lane.

Referring to FIG. 3, the LKAS system 120 may include: a lane detection sensor 122 that detects a lane; an LKAS controller 124 that determines whether a vehicle keeps a lane, and generates a control signal based on the result of the determination; an LKAS warning unit 126 that generates a warning signal based on a control signal of the LKAS controller 124; and/or a steering controller 128 that generates a steering signal based on a control signal of the LKAS controller 124.

The lane detection sensor 122 is a sensor for detecting a lane in front of a vehicle, and an optical sensor, a laser sensor, an infrared ray sensor, or the like may be used. The LKAS controller 124 determines whether a vehicle keeps a lane based on the information from the lane detection sensor 122. The determination may be performed when it is determined that the vehicle drives in a straight line. For example, determining whether a vehicle keeps a lane may be set to be performed when there is no lane change signal input from a driver.

For example, when the LKAS controller 124 determines that the vehicle does not keep a lane, the LKAS warning unit 126 may generate a warning signal using vision, hearing, tactile sensation, or the like. When the vehicle does not keep a lane although the warning signal is provided, the steering controller 128 may control steering in order to keep the lane.

In FIGS. 1 to 3, the controller 130, the EPS controller 116, and the LKAS controller 124 are described as separate elements. However, this is for the ease of description. They may be a single element that is capable of controlling a drowsy state warning, an EPS, an LKAS, in parallel. Alternatively, they may be configured as separate hardware or may be configured as separate software or program modules.

Referring again to FIG. 1, the EPS system 110 may control steering based on the measurement values of the steering angle sensor 112 and the torque sensor 114. The LKAS system 120 may control a warning and/or steering in order to keep a lane based on the measurement value of the lane detection sensor 122.

The controller 130 may determine whether the vehicle currently drives in a straight line. For example, in the LKAS system 120, the controller 130 may share the result of determining whether the vehicle drives in a straight line. Alternatively, the controller 130 may autonomously determine whether the vehicle drives in a straight line. For example, when there is no lane change signal input from a driver, the controller 130 may determine that the vehicle drives in a straight line.

When it is determined that the vehicle drives in a straight line, the controller 130 may determine whether the speed of the vehicle is greater than or equal to a predetermined speed. The predetermined speed may be set to a speed at which drowsy driving may be dangerous.

When it is determined that the vehicle drives in a straight line and/or when the vehicle speed is greater than or equal to a predetermined speed, the controller 130 may turn a drowsiness warning system on. The controller 130 may analyze a steering signal from the EPS system 110. Particularly, the controller 130 may analyze the frequency of a change in a measurement value from the steering angle sensor 112 or the frequency of a change in a measurement value from the torque sensor 114 during a predetermined period of time (e.g., 1 minute). The controller 130 may determine whether the frequency of a change in a steering signal is less than or equal to a reference value. When the driver is drowsy, the driver may be careless in steering, and thus, the frequency of a change in a steering signal that is less than or equal to a reference value may be used for determining a driver's drowsiness state. Alternatively, in the case in which the frequency of a change in a steering signal is less than or equal to a predetermined reference frequency, it is determined that the driver is in a drowsy state. Alternatively, when the frequency of a change in a steering signal is included in a predetermined range, it is determined that the driver is in a drowsy state. The reference frequency or a predetermined range may be set in advance based on an experiment or the like, or may be changed based on the result of learning driver's driving habits. Learning the driver's driving habits may be performed through mechanic learning.

Alternatively, the controller 130 may analyze a warning signal or a steering request signal from the LKAS system 120. Particularly, the controller 130 may analyze the frequency of a warning signal or the frequency of a steering request signal during a predetermined period of time (e.g., 1 minute). The controller 130 may determine whether the frequency of a warning signal or the frequency of a steering request signal is greater than or equal to a reference value. When the driver is drowsy, the driver may not keep a lane and thus, generating a warning signal or a steering request signal may be used for determining a driver's drowsiness state.

When the frequency of a steering signal is less than or equal to a reference value and the frequency of a warning signal or the frequency of a steering request signal is greater than or equal to a reference value, the controller 130 may determine that the driver is drowsy. Alternatively, when it is determined that the driver is drowsy since the frequency of a steering signal is less than or equal to a reference value and the frequency of a warning signal or the frequency of a steering request signal is greater than or equal to a reference value, the controller 130 may generate a drowsiness warning signal.

Alternatively, when it is determined that the frequency of a change in a steering signal is less than or equal to a predetermined reference frequency during a predetermined period of time, and a vehicle is out of a lane that the vehicle drives along, the controller 130 may determine that the driver is in a drowsy state. For example, when an LKAS system generates a warning signal or a steering request signal in the state in which the frequency of a change in a steering signal is less than or equal to a predetermined reference frequency, it is determined that the driver is in a drowsy state.

Alternatively, when it is determined that the frequency of a change in a steering signal is less than or equal to a predetermined reference frequency during a predetermined period of time and the state in which a vehicle is out of a lane that the vehicle drives along is maintained at least a predetermined period of time, the controller 130 may determine that the driver is in a drowsy state. For example, when the driver does not eliminate a warning signal during a predetermined period of time or does not perform steering based on a steering request signal even after a warning signal or a steering request signal is generated from the LKAS system under the state in which the frequency of a change in a steering signal is less than or equal to a predetermined reference frequency, it is determined that the driver is in a drowsy state.

That is, the controller 130 may determine whether the driver is drowsy based on at least one out of the frequency of a change in a steering signal and whether a vehicle is out of a lane that the vehicle drives along.

When a drowsiness warning signal is generated, the warning display unit 140 may generate a warning that the driver may recognize. For example, the warning may include at least one out of: a steering warning that generates a reaction that is opposite to the steering of the driver; a sound warning that acoustically warns the driver; a gauge warning that visually warns the driver through a gauge; an emergency light warning that flashes an emergency light; and other schemes that may inform the driver of a drowsy state.

In the above described embodiments, when the frequency of a steering signal is less than or equal to a reference value and the frequency of a warning signal or the frequency of a steering request signal is greater than or equal to a reference value, the controller 130 may determine that the driver is drowsy. Alternatively, based on the frequency of a steering signal and whether a vehicle is out of a lane that the vehicle drives along, the controller 130 may determine whether the driver is drowsy. For example, the controller 130 first determines whether the frequency of steering is less than or equal to a reference value, and when the frequency of steering is less than or equal to the reference value, the controller 130 may determine whether the frequency of a warning signal or the frequency of a steering request signal is greater than or equal to a reference value. Alternatively, the controller 130 may determine first whether the frequency of a warning signal or the frequency of a steering request signal is greater than or equal to a reference value, and when the frequency of a warning signal or the frequency of steering request signal is greater than or equal to the frequency, the controller 130 may determine whether the frequency of steering is less than or equal to a reference value.

As another example, the controller 130 may determine that the driver is in a drowsy state when the frequency of a change in a steering signal is less than or equal to a reference frequency. As another example, when it is determined that the frequency of a change in a steering signal is less than or equal to a predetermined reference frequency, and a vehicle is out of a lane that the vehicle drives along, the controller 130 may determine that the driver is in a drowsy state. As another example, when it is determined that the frequency of a change in a steering signal is less than or equal to a predetermined reference frequency and the state in which a vehicle is out of a lane that the vehicle drives along, is maintained at least a predetermined period of time, the controller 130 may determine that the driver is in a drowsy state.

In the above described embodiments, the controller 130 may determine whether the frequency of a steering signal is less than or equal to a reference value, and may determine whether the frequency of a warning signal or the frequency of a steering request signal is greater than or equal to a reference value. However, the present embodiment may not be limited thereto, the controller 130 may determine whether the frequency of a steering signal is less than or equal to a reference value or may determine whether the frequency of a warning signal or a steering request signal is greater than or equal to a reference value.

Figure 4:
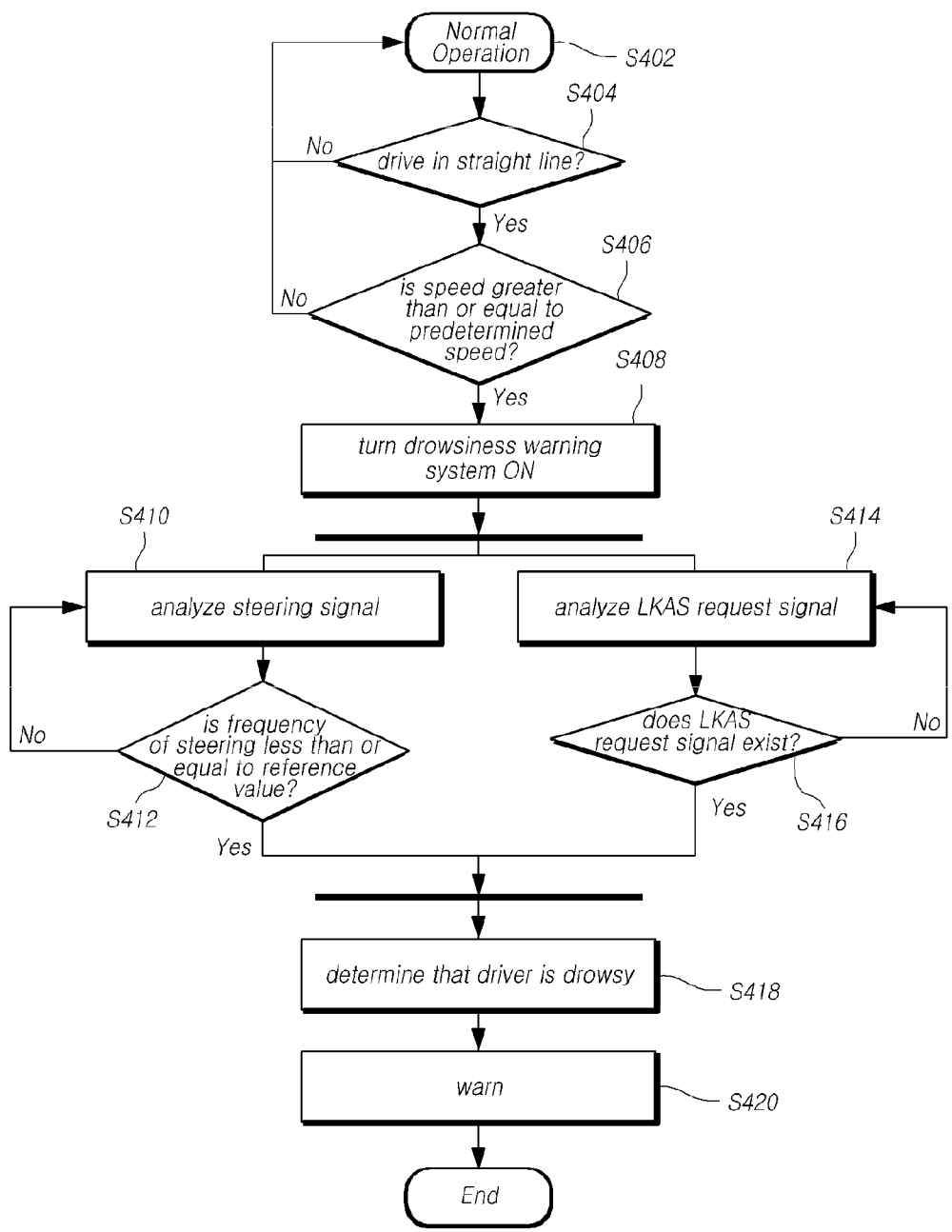
FIG. 4 is a flowchart illustrating a method according to an embodiment of the present disclosure.

FIG. 4 is a flowchart illustrating a method according to an embodiment of the present disclosure.

Referring to FIG. 4, when a vehicle normally drives in operation S402, the controller 130 determines whether the vehicle drives in a straight line in operation S404.

When the vehicle drives in a straight line (Yes in operation S404), the controller 130 determines whether the speed of the vehicle is greater than or equal to a reference speed in operation S406.

When the vehicle does not drive in a straight line (No in operation S404) or the speed of the vehicle is less than the reference speed (No in operation S406), the controller 130 proceeds with a normal operation in operation S402, and repeats operations S404 to S406.

In FIG. 4, whether the vehicle drives in a straight line is first determined in operation S404, and subsequently, whether the speed of the vehicle is greater than or equal to the reference speed is determined in operation S406. However, this is merely an example, and the order of operations S404 and S406 may change.

When the vehicle drives in a straight line and the speed of the vehicle is greater than or equal to the reference speed (Yes in operation S404 and Yes in operation S406), the controller 130 may switch a drowsiness warning system into an on-state in operation S408.

The controller 130 analyzes a steering signal in operation S410. In this instance, the controller 130 may set a pattern of a frequency of a change in a motor position angle during a predetermined period of time (e.g., 1 minute after the beginning).

Subsequently, the controller 130 determines whether the frequency of a steering signal is continuously (e.g., more than 3 seconds) less than or equal to a reference value in operation S412. When the frequency of a steering signal is greater than the reference value (No in operation S412), the method proceeds with operation S410.

The controller 130 analyzes an LKAS request signal in operation S414. In this instance, the controller 130 may use an LKAS warning signal or an LKAS steering request signal, which is input through a communication bus.

The controller 130 determines whether the LKAS request signal exists in operation S416. When the LKAS request signal does not exist (No in operation S416), the method proceeds with operation S414.

When the frequency of a steering signal is less than or equal to the reference value (Yes in operation S412) and the LKAS request signal exists (Yes in operation S416), the controller 130 determines that the driver is in a drowsy state in operation S418. The controller 130 executes warning, such as steering warning, sound warning, gauge warning, emergency light warning, and the like in operation S420.

FIG. 4 illustrates that the controller 130 simultaneously determines whether the frequency of a steering signal is less than or equal to the reference value in operation S412, and whether the LKAS request signal exists in operation S416. However, the present embodiment may not be limited thereto. It is also possible that operation S416 that determines whether the LKAS request signal exists is executed when the frequency of a steering signal is less than or equal to a reference value (Yes in operation S412), or operations S412 that determines whether the frequency of a steering signal is less than or equal to a reference value is executed when the LKAS request signal exists (Yes in operation S416).

Alternatively, in another embodiment of the present invention, the controller 130 determines whether the driver is in a drowsy state based on only one out of whether the frequency of a steering signal is less than or equal to the reference value in operation S412 and whether the LKAS request signal exists in operation S416.

Alternatively, in another embodiment of the present invention, the controller 130 may determine that the driver is in a drowsy state when the frequency of a change in a steering signal is less than or equal to a predetermined reference frequency. That is, based on only the frequency of a change in a steering signal, the drowsy state of the driver may be determined.

Alternatively, in the operation of determining whether the driver is drowsy, when it is determined that the frequency of a change in a steering signal is less than or equal to a predetermined reference frequency during a predetermined period of time, and a vehicle is out of a lane that the vehicle drives along, the controller 130 may determine that the driver is in a drowsy state.

Alternatively, in the operation of determining whether a driver is drowsy, when it is determined that the frequency of a change in a steering signal is less than or equal to a predetermined reference frequency during a predetermined period of time, and the state in which a vehicle is out of a lane that the vehicle drives along, is maintained at least a predetermined period of time, the controller 130 may determine that the driver is in a drowsy state.

Even when all the elements constituting the above embodiments have been described as being combined into a single unit or combined to be operated as a single unit, the present invention is not necessarily limited to such embodiments. That is, at least two elements of all structural elements may be selectively joined and operate without departing from the scope of the present invention. The above embodiments have been described merely for the purpose of illustrating the technical idea of the present invention, and those skilled in the art will appreciate that various modifications and changes are possible without departing from the scope and spirit of the present invention. The scope of the present invention shall be construed on the basis of the accompanying claims in such a manner that all of the technical ideas included within the scope equivalent to the claims belong to the present invention.

What is claimed is:

1. A driver's drowsiness warning system, comprising:
   a vehicle speed sensor configured to measure a vehicle speed;
   a steering angle sensor configured to measure a steering signal;
   a lane recognizing sensor configured to recognize a lane;
   a lane keeping assist unit configured to determine whether a vehicle is out of a lane that the vehicle drives along; and
   a controller configured to,
      when the vehicle drives in a straight line and the vehicle speed is faster than a predetermined speed, determine whether a driver is drowsy based on at least one out of a frequency of a change in the steering signal during a predetermined period of time and whether the vehicle is out of the lane that the vehicle drives along, and
      generate a warning to the driver when it is determined that the driver is drowsy,
   wherein the controller is configured to
      when the frequency of the change in the steering signal during the predetermined period of time is less than predetermined reference frequency, determine the driver is drowsy, and
      when the lane keeping assist unit determines that the vehicle is out of the lane, determine the driver is drowsy.

2. The system of claim 1, wherein the warning includes at least one out of steering reaction controlling, sound warning, gauge warning, and emergency light warning.

3. A driver's drowsiness warning method, which is executed in a system that includes a vehicle speed sensor, a steering angle sensor, a lane recognizing sensor, a lane keeping assist unit that enables a vehicle to keep a lane, and a controller, the method comprising:
   measuring, by the vehicle speed sensor, a vehicle speed;
   measuring, by the steering angle sensor, a steering signal;
   recognizing, by the lane recognizing sensor, a lane;
   determining, by the lane keeping assist unit, whether a vehicle is out of the lane based on the recognized lane;
   determining, when the vehicle drives in a straight line and the vehicle speed is faster than a predetermined speed, whether a driver is drowsy based on at least one out of a frequency of a change in the steering signal during a predetermined period of time and whether the vehicle is out of the lane that the vehicle drives along; and
   generating, by the controller, a warning to the driver when it is determined that the driver is drowsy
   wherein
      when the frequency of the change in the steering signal during the predetermined period of time is less than predetermined reference frequency, the controller determines the driver is drowsy, and
      when the lane keeping assist unit determines that the vehicle is out of the lane, the controller determines the driver is drowsy.

4. The method of claim 3, wherein the warning includes at least one out of steering reaction controlling, sound warning, gauge warning, and emergency light warning.

* * * * *